United States Patent Office 2,902,237
Patented Sept. 1, 1959

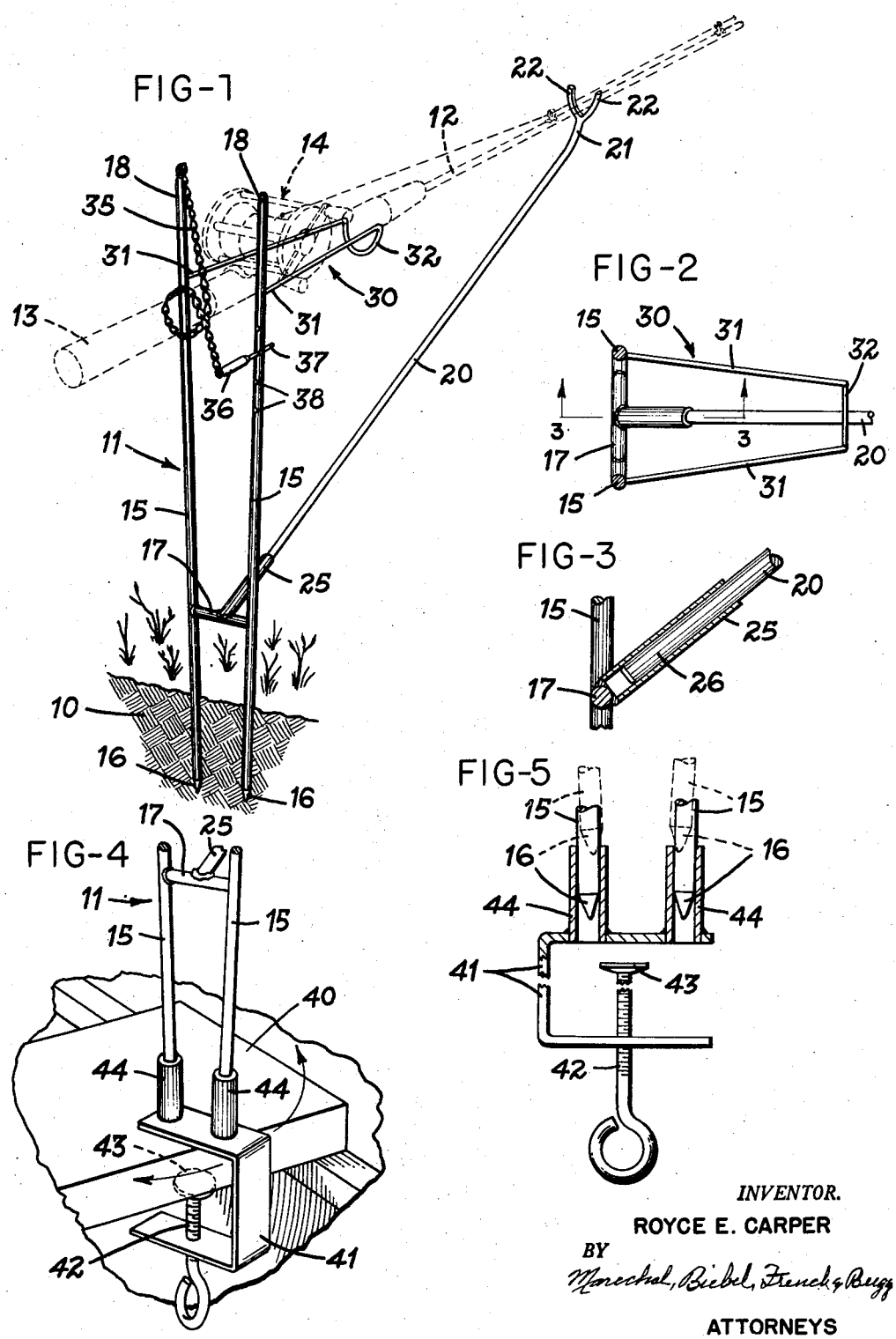

2,902,237

HOLDER FOR FISHING ROD AND REEL

Royce E. Carper, Dayton, Ohio

Application March 4, 1954, Serial No. 414,039

3 Claims. (Cl. 248—42)

This invention relates to holders for fishing rods, and more particularly to such a holder adapted to support a rod and reel and having releasable fastening means for holding them firmly in fishing position so that they will not be pulled or jerked out of the holder when in the attached position thereof, and which in the detached position will permit quick removal of the rod and reel from the holder by direct vertical movement when a fish strikes or bites.

It is desirable in a fishing rod holder that the rod be retained securely so as not to be drawn into the water by the pull of a fish attached to the line or the pull of the line itself if it should become caught during trolling, for example, or by the drag of the water on the line. It is important also to avoid unnecessarily moving the bait about and frightening the fish off, and that when the fish has taken the bait or strikes, the angler may grasp the fishing rod handle quickly and have practically instantaneous control over the rod and reel. Inasmuch as any movement of the rod tends to be immediately communicated through the line to the bait it is desirable that the angler may remove the rod from the holder with minimum disturbance of the tip of the pole such as would result from moving the rod in a horizontal direction or by upward or downward movement of the tip of the rod in freeing the rod from the holder.

It is accordingly a principal object of the invention to provide a support for fishing rods and reels in which the rod is secured firmly in the support until a fish bites or strikes, but which can readily be removed therefrom for hooking or playing the fish by directly vertical movement of the rod handle merely by releasing the securing means, without substantial horizontal movement of the rod and reel in freeing it from the holder.

It is a further object to provide such a support which may be used with substantially any form of rod and reel generally available and also with a simple fishing pole, which is adapted to be placed in rod supporting position selectively either by being pressed into the earth along the bank or shore or by being clamped to part of a boat, dock or the like, which may be disassembled for easy shipment, carrying and storing, and which is simple in structure and operation and durable in use.

Other objects and advantages of the invention will be apparent from the following description, the accompanying drawing and the appended claims.

In the drawing—

Fig. 1 is a perspective view of the rod and reel holder shown in use from a bank with a fishing rod and reel supported therein as indicated in dotted lines;

Fig. 2 is a top plan view of the device with the tops of the leg members shown in section for clarity;

Fig. 3 is a sectional view taken on the line 3—3 of Fig. 2;

Fig. 4 is a perspective view of the lower end of the holder shown in use with the clamp attached to the seat of a boat; and Fig. 5 is a side elevational view partly in section showing the ends of the leg members of the support inserted in the clamp member in full lines, and at the start of insertion therein in dotted lines.

Referring to the drawing, which illustrates a preferred embodiment of the invention, Fig. 1 shows the holder in use in fishing from the bank 10 of a lake or stream, with upright standard 11 supporting rod 12 having a handle 13 to which reel 14 is affixed. The standard includes leg members 15 joined above their lower ends 16 by spacer member 17. Their lower ends are pointed for easy insertion into the ground, and their upwardly projecting portions 18 form an open topped fork at the top of the standard permitting the rod and reel to be placed in fishing position and withdrawn by direct vertical movement without obstruction.

Arm 20 projects upwardly and forwardly from the lower portion of the standard, the outer end 21 being bent slightly upward as shown and being constructed at its upper end to receive and support rod 12 at a point spaced forwardly from rod handle 13, the end being shown as split to form an upwardly opening U or Y having a pair of arms 22. To facilitate storage, shipment and carrying the device it is desirable that arm 20 may be removed, and cooperating means are therefore provided at the lower portion of the standard and on the arm forming a detachable connection therebetween. Figs. 1–3 show a socket 25 for this purpose secured at an appropriate angle to spacer member 17 and proportioned to receive inner end 26 of the rod arm when in rod holding position.

A reel cradle 30 for receiving and supporting the handle end of the fishing rod and its attached reel is supported on the standard, extending forwardly of the standard in the direction of rod arm 20. To accommodate fishing rods and reels of varying forms and sizes and differing arrangements for fastening the reel to the rod, the reel cradle is provided with parts 31 spaced from each other and adapted to receive the fishing rod between them. If this cradle is formed in a single piece bent in the form of a U, as shown in the drawing, with its ends attached to the leg members it will strengthen the standard, and its outer end may easily be bent downward as indicated at 32 to provide room for passage of the rod therethrough. In the case of the usual rod and reel combination, the rod will not seat in the looped end 32 of the cradle but will pass above it and be supported in position by the lower part of the reel frame resting on parts 31, as shown. When, however, the holder is used with a simple fishing pole without a reel, it is apparent that such pole may rest directly in the cradle, where it will be supported in fishing position between points 32 and the arms 22 at the end of rod supporting arm 20.

In order that the rod and reel will be fastened securely in fishing position, and yet may be readily withdrawn from the standard and reel cradle by directly vertical movement, a flexible fastening 35 is provided secured at one end to standard 11 and fitted at the other with means for quickly detaching such end. A chain or chain-like fastening such as is shown in the drawing engageable over the rod handle provides an excellent fastening for this purpose, having a key or pin 36 including a reduced portion 37 at its outer end adapted to be inserted in one of a series of holes 38 provided in one leg of the standard for such purpose, which forms a quickly and easily operable connection. Fastening 35 is of sufficient length to be looped or turned once around handle 13 of the rod in position to grip the rod handle so as to prevent forward movement and upward movement of the rod on the standard in the secured position of the fastening, with one end secured to one leg of the standard, preferably above the level of the reel cradle, the holes 38 preferably being on the other leg of the standard and below the level of the reel cradle. A plurality of holes is provided in order that the fastening may be thus looped over and around rod handles of varying sizes, yet not so tightly so to prevent quick and easy removal.

The device includes also a detachable clamp portion supporting the standard in upright position on a portion 40 of a boat, as shown in Fig. 4, or a dock or similar place in which the legs of the standard cannot be thrust into the ground. The clamp portion includes bracket 41 provided with a threaded clamp 42 on which is rotatably mounted a flat head 43 for providing a firm grip on the boat part without marring it. A pair of sockets 44 adapted to receive the ends 16 of standard 11 are secured to the upper part of the clamp, the distance between their openings being slightly less than the normal distance between such ends, and thus when the ends are pressed into place in the sockets they are spread or distorted slightly out of normal position, indicated by the dotted lines in Fig. 5, into the position indicated in full lines therein, where their natural resilience holds them securely in place and assures that the support or standard will provide a firm, sure holder for a fishing rod and reel.

Inasmuch as the holder consists essentially of three simple parts which may be made from readily available materials, it may be simply and inexpensively manufactured. The standard may be made from quarter inch steel bar stock with the spacer member welded in place, and the cradle formed from 1/16 inch round steel stock readily bent into shape and either welded to the upper portion of the standard or inserted into holes provided therein for such purpose. It thus becomes in effect integral with the leg portions and serves to strengthen the standard without obstructing neither the upper part nor the rear portion thereof. The flexible fastening means may similarly be welded to one of the upright legs and the sockets for the rod-supporting arm and for receiving the lower ends of the legs when the clamp is used may easily be formed from steel tubing. Thus the device may be manufactured and sold at relatively low cost.

In packaging, shipping and storing the device is disassembled and makes a relatively small package which in disassembled condition may easily be carried with other fishing equipment. The interfitting parts are readily attached and detached merely by pressing them into and out of engagement, and there are no moving or adjustable parts apt to become locked or bound. As will be apparent, when the device is used from the bank or shore it may be placed at any desired angle and position merely by grasping the upper ends of leg members 15 and thrusting their pointed lower ends 16 firmly into the ground. After the line and bait have been cast into the desired position, the rod is rested in the holder, normally supported by the reel, as stated. Flexible fastening 35 is then looped over and turned once around the handle and secured by thrusting lock or pin 36 into the appropriate hole.

When a fish strikes, the tip of the rod will tend to be bent downward and handle 13 to be forced upward, tightening the grip of the fastening means thereon. As stronger force is applied, the flexible support tends to grip the handle more securely, so that even if force is exerted directly along the axis of the fishing rod, as is unlikely to occur in use, it is difficult if not impossible to pull handle 13 out of the support when the fastening is secured around it.

When a fish takes the bait lightly, however, or is hooked and running out with the line, the angler may grasp the handle of the rod with one hand as he releases the fastening means with the other. Because the top and rear portions of the holder are completely free from projections or obstructions, with the handle projecting rearwardly through the fork in immediately available position, the angler's hand naturally grips the handle in position for setting the hook or playing the fish. The rod handle and reel may be removed from the support by direct vertical movement without necessity for moving them horizontally with resulting movement or jerking of the tip so as to frighten the fish before it is securely hooked, or undesirable slackening of the line which might permit escape of a hooked fish.

When used in conjunction with the clamp portion from a dock or boat the angler has the advantages heretofore specified. Additionally, as indicated by the arrows in Fig. 4, the clamp may be turned through a substantial horizontal arc, and thus the standard may be placed in substantially any desired position for supporting the rod and reel, free from possible interference of the line with oars or motor.

Thus the present invention provides a simple and convenient holder for a fishing rod and reel which affords many advantages. When in use in fishing position the rod and reel are secured firmly by the flexible fastening turned around the rod handle so that a pull on the line tends to tighten rather than to release the fastening around the handle, and prevents the possibility that the rod and reel may be drawn into the water. The detachable end of the fastening means may, however, be quickly released and the rod and reel are thus freed from the fastening and may be lifted upward out of the holder by directly vertical movement. The placing and arrangement of the parts permits the rod handle to be grasped in a single movement with the rod and reel automatically in natural position for hooking or playing the fish. With the device of the invention the angler has the advantages of using a fishing pole holder, while having substantially the same degree of control over the movement and handling of his fishing rod and reel as though they were not fastened.

While the form of device herein described constitutes a preferred embodiment of the invention, it is to be understood that the invention is not limited to this precise form of device, and that changes may be made therein without departing from the scope of the invention which is defined in the appended claims.

What is claimed is:

1. A fishing rod holder of the character described comprising a pair of spaced legs connected below the upper ends thereof providing an open-topped standard, an open-topped reel cradle extending forwardly from said standard adapted to receive and support the handle end of the fishing rod, an arm projecting upwardly and forwardly from the lower portion of said standard and having upwardly opening means at the outer end thereof to receive and support the fishing rod at a position on said rod spaced forwardly from said rod handle, a flexible fastening member secured at one end to said standard adapted to be looped around said rod handle in position to grip said rod handle for preventing forward and/or upward movement of said rod in said standard, interfitting means on said standard and the end of said fastening member opposite said secured end forming a quickly releasable connection between said standard and said fastening member for freeing said rod handle in the released position of said fastening member providing for removal of said rod from said standard by direct vertical movement with minimum disturbance of the tip of said rod.

2. A fishing rod holder of the character described comprising a pair of spaced legs connected below the upper ends thereof providing an open-topped standard, an open-topped reel cradle extending forwardly from said standard adapted to receive and support the handle end of the fishing rod, an arm projecting upwardly and forwardly from the lower portion of said standard and having upwardly opening means at the outer end thereof to receive and support the fishing rod at a position on said rod spaced forwardly from said rod handle, means on said standard and said arm forming a detachable connection therebetween for removably fastening said arm to said standard, a flexible chain-like fastening member secured at one end to said standard adapted to be looped around said rod handle in position to grip said rod handle for preventing forward and/or upward movement of said rod in said standard, interfitting means on said standard and the end of said fastening member opposite said secured end forming a quickly releasable connection between said standard and said fastening member for freeing said rod handle in the released position of said fastening member providing for removal of said rod from said standard by direct vertical movement with minimum disturbance of the tip of said rod.

3. A fishing rod holder adapted to be supported selectively from a boat or the like and from shore, comprising a pair of spaced legs connected below the upper ends thereof providing an open-topped standard, an open-topped reel cradle extending forwardly from the upper end of said standard adapted to receive and support the rod handle, a socket on the lower portion of said standard, an arm projecting upwardly and forwardly from the lower portion of said standard releasably received at its inner end in said socket and having upwardly open means at the outer end to receive and support the fishing rod at a position on said rod spaced forwardly from said rod handle, a flexible fastening member secured at one end to said standard adjacent said reel cradle and engageable around the handle of said rod in position to grip said handle for preventing forward and/or upward movement of said rod, said fastening member having a pin at the end thereof opposite said secured end, one of said legs having a plurality of holes adapted to releasably receive said pin in the handle gripping position of said fastening member and to free said pin in the handle releasing position of said fastening member providing for quick release and removal of said rod from said standard by direct vertical movement of said rod, a clamp member including a pair of sockets spaced apart a distance slightly different from the normal distance between the lower ends of said legs and detachably receiving and resiliently retaining said legs by slight distortion of said legs, the lower ends of said legs being adapted for insertion into the ground in the detached position of said clamp and into said clamp sockets in the attached position of said clamp, and means on said clamp member providing for supporting said standard from a boat or the like.

References Cited in the file of this patent

UNITED STATES PATENTS

| | | |
|---|---|---|
| 1,552,535 | Beerstecher | Sept. 18, 1925 |
| 2,059,921 | Weiss | Nov. 3, 1936 |
| 2,127,790 | Smoot | Aug. 23, 1938 |
| 2,130,397 | Niedhammer | Sept. 20, 1938 |
| 2,518,908 | Korus | Aug. 15, 1950 |
| 2,555,982 | Mart | June 5, 1951 |
| 2,564,840 | Glenn | Aug. 21, 1951 |
| 2,592,306 | Maze | Apr. 8, 1952 |
| 2,593,783 | Mitchell | Apr. 22, 1952 |

FOREIGN PATENTS

| | | |
|---|---|---|
| 171,290 | Great Britain | Nov. 17, 1921 |
| 189,339 | Switzerland | May 1, 1937 |